Aug. 18, 1959

S. C. ROGERS 2,900,507

SAMPLING CIRCUIT

Filed June 28, 1955

INVENTOR
S. C. ROGERS
BY W L Keefauver
ATTORNEY

United States Patent Office 2,900,507

Patented Aug. 18, 1959

2,900,507

SAMPLING CIRCUIT

Samuel C. Rogers, Morristown, N.J., assignor to Bell Telephone Laboratories, Incorporated, New York, N.Y., a corporation of New York Application June 28, 1955, Serial No. 518,542

13 Claims. (Cl. 250—31)

This invention relates to pulse position demodulators and more particularly to sampling and storage circuits for converting a pulse position code into a direct-current potential.

One method for demodulating a pulse position code is to sample the output wave of a generator producing a varying potential in such a manner that the magnitude of the sample is indicative of the time interval between two particular pulses. The first pulse triggers the generator, and the second pulse triggers a device for sampling the output wave. A suitable storage device is provided to hold the sample while the information which it represents is being utilized. The heart of the sampling circuit is a switching device which is activated by the second pulse. The switch must be capable of completing the switching operations rapidly, and it must be able to pass both positive and negative samples since in many applications the sample contains both positive and negative components. It must have a low closed circuit impedance so that the sample is not attenuated in the switch and a high open circuit impedance so that the stored sample is not given a false amplitude by a spurious charge in the storage device resulting from leakage through the switch.

The transistor sampling circuit disclosed in the copending application of P. A. Reiling, Serial No. 410,924, filed February 17, 1954 would be extremely well suited to this type of operation except for the fact it has a finite open circuit impedance which is in the order of several megohms. During the time when the transistor switch is open the transistor electrode bias sources and the output wave generator cause a leakage current to flow through the switch giving a false indication in the output which is intolerable in some system applications.

It is therefore one object of this invention to improve the operation of transistor sampling circuits.

Another object of this invention is to facilitate the storage and subsequent utilization of sampling circuit signals which have both positive and negative components.

Still another object of this invention is to reduce the effects on electric energy storage devices of open circuit leakage through transistor switches in an associated sampling circuit.

These and other objects of this invention are carried out in an illustrative embodiment thereof wherein a transistor switch, a slope voltage generator circuit, and a charge storage device are serially connected in a loop. The storage device is divided into two elements arranged to store positive and negative components of the sample respectively. A resistor having an impedance of a lower order of magnitude than the open circuit impedance of the switch, and a higher order of magnitude than the switch closed circuit impedance is connected in parallel with the sample storage device. An adder circuit is provided to combine the signals stored in the two elements of the storage circuit into a single output voltage for use as a control potential.

Additional objects and advantages of this invention will be apparent from an examination of the following specification and the illustrative embodiments in the single sheet of drawings wherein.

Figure 1:
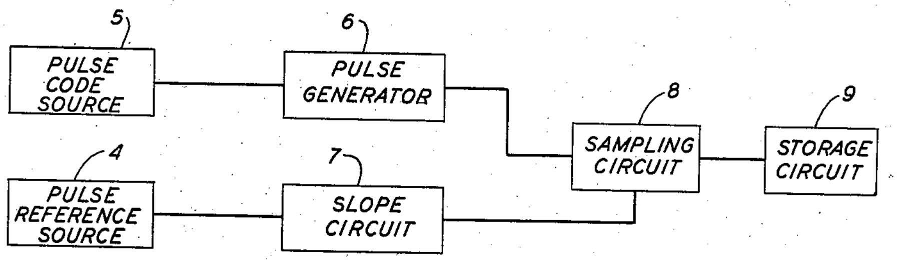
Fig. 1 is a schematic box diagram of a pulse position demodulator in accordance with this invention.

A pulse position demodulator in accordance with the invention is illustrated in Fig. 1 and includes a source 4 of reference pulses and a source 5 of pulses which are position modulated with respect to the reference pulses from source 4. Information is contained in these pulse position modulated signals in a position code represented by the time interval between a reference pulse from source 4 and the next following pulse from source 5. A pulse generator 6 produces one pulse in response to each pulse applied thereto from the source 5 of pulses modulated in accordance with the position code. A circuit 7 generates an output wave having a varying amplitude in response to the application thereto of a reference pulse from source 4. The circuit 7 may be a slope circuit of the type described and illustrated in vol. 19 of the Massachusetts Institute of Technology Radiation Laboratory Series entitled, "Waveforms," by Chance, Hughes, MacNichol, Sayre and Williams, starting at page 261. The first pulse of a pair which is to be demodulated is a reference pulse from source 4 and it activates the slope circuit 7 to cause a varying output wave of a predetermined configuration with respect to time to be produced in the output thereof. The second, or coded, pulse is received from source 5 and activates pulse generator 6 which in turn closes the switch in a sampling circuit 8 for the duration of the coded pulse. Sampling circuit 8 thereby takes a sample of the output wave of slope circuit 7 during the interval of the coded pulse and stores such sample in the storage circuit 9.

Figure 2:
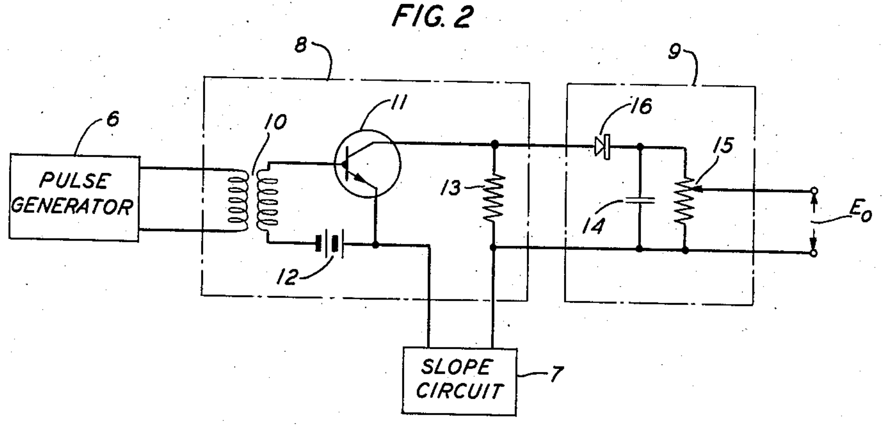
Fig. 2 is a schematic circuit diagram of the sampling and storage circuits of Fig. 1.

The sampling circuit 8 is illustrated in detail in Fig. 2 and comprises a coupling transformer 10, the transistor 11, a source 12 of bias potential and a resistor 13. Transformer 10 couples the output of pulse generator 6 to the base-emitter circuit of transistor 11. Transistor 11 is arranged to perform the function of a switch; and transformer 10, source 12, and the output of generator 6 are so proportioned with respect to one another that transistor 11 normally rests in its switch-open, or high internal emitter-collector impedance, condition in the absence of pulses from generator 6. Upon the application of a pulse to the base of transistor 11 it is triggered into its switch-closed, or low impedance, condition corresponding to current saturation of the emitter-collector circuit. This switching operation is described in greater detail in the copending application of P. A. Reiling, Serial No. 410,924, filed February 17, 1954.

The internal emitter-collector circuit of transistor 11 is connected in a loop with slope circuit 7 and resistor 13. The output voltage of sampling circuit 8 appears across resistor 13, and it is coupled to the sample storage circuit 9. Samples in storage circuit 9 are applied to the capacitor 14 by means of a diode 16. A resistor 15 is connected in parallel with capacitor 14. The diode 16, interposed between resistor 13 and capacitor 14, prevents charges stored in capacitor 14 from leaking back through resistor 13. Diode 16 must be so poled with respect to the voltage generated by slope circuit 7 that capacitor 14 can be charged thereby when transistor 11 is in its switch-closed condition. In the case of the p-n-p transistor 11 illustrated in Fig. 2, diode 16 is poled for conduction from resistor 13 toward capacitor 14. Resistor 15 is of such magnitude with respect to resistor 13 that it will have no appreciable effect on the time constant of the charging circuit for capacitor 14. Resistor 15 is also large enough to prevent the immediate dissipation of charges stored in capacitor 14. The latter requirement, however, will be governed by the needs of the system in which the demodulator is used.

The sampling and storage circuits are arranged to demodulate a pulse position modulated signal and make available for utilization the information it contains. The modulated signal in the circuits of Figs. 1 and 2 consists of the pulses supplied by sources 4 and 5 with a significant time lag of each particular pulse of source 5 behind a corresponding pulse from source 4. The first, or reference, pulse of any particular pair to be demodulated is supplied by source 4 and triggers slope circuit 7 into operation generating a voltage which varies in a linear fashion between two predetermined magnitudes. The second, or coded, pulse of the pair is supplied by source 5 and causes pulse generator 6 to produce a pulse of appropriate magnitude and configuration to trigger transistor 11 into saturated conduction for the duration of the coded pulse. In this condition the impedance of the internal emitter-collector circuit of transistor 11 is very small, of the order of 5 ohms or less, compared to the impedance of resistor 13. Substantially all of the voltage generated by slope circuit 7 appears across resistor 13 and charges capacitor 14 to this potential. In other words, a sample of the output voltage of the slope circuit 7 is stored in capacitor 14. Since the output voltage wave configuration for slope circuit 7 is known, the sample amplitude is a function of the elapsed time between the reference and coded pulses. Upon the triggering of transistor 11 to its switch-open condition at the end of the second pulse, the sample is terminated and capacitor 14 discharges through resistor 15 at a rate dependent upon the time constant of capacitor 14 and resistor 15. A potential having a magnitude that is proportional to the time interval between the pulses from sources 4 and 5 is thus available for utilization at the tap on resistor 15 while capacitor 14 is discharging.

When transistor 11 is in its switch-open condition there is leakage through its internal emitter-collector circuit to resistor 13 from slope circuit 7. The impedance of transistor 11 in this condition is of a higher order of magnitude than the impedance of resistor 13. Therefore, the potential drop appearing across resistor 13 is a corresponding order of magnitude less than the total loop potential, hence the charge stored on capacitor 14 is negligible.

Without resistor 13 in the circuit the charge appearing on capacitor 14 would correspond to the potential drop in resistor 15 due to the leakage current. Since the resistance of resistor 15 is necessarily of the same order of magnitude as the switch-open impedance of transistor 11, a substantial charge would always be present on capacitor 14. This would result in a continuous error voltage at the tap on resistor 15 when transistor 11 is in its switch-open condition as well as an amplitude distortion of samples stored in capacitor 14 when transistor 11 is in its switch-closed condition.

Figure 3:
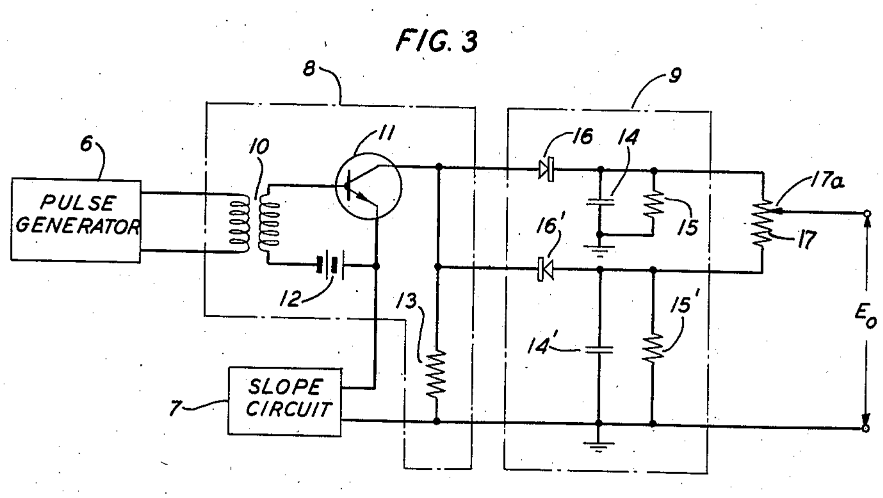
Fig. 3 is a schematic diagram of a circuit, similar to the circuit of Fig. 2, which is suitable for storing samples which may have both positive and negative components.

Referring to Fig. 3, there is shown an embodiment of the invention which is suitable for systems wherein it is convenient to demodulate a pulse position code by means of a slope circuit output voltage having both positive and negative components. The sampling circuit 8 in Fig. 3 is the same as that in Fig. 2. Storage circuit 9 has been modified by the addition of a second storage section including diode 16', capacitor 14', and resistor 15' connected in the same configuration as the original storage section shown in Fig. 2 and in parallel with that section. Diode 16' is poled to conduct samples of the opposite polarity from those conducted by diode 16. The potentials represented by the charges on capacitors 14 and 14' are additively combined in potentiometer 17, and the sampling and storing circuit output voltages $E_0$ is derived between ground and an adjustable tap 17*a* on potentiometer 17 as illustrated in Fig. 3.

The operation of the circuit of Fig. 3 is similar to that of the circuit in Fig. 2. Resistor 13 prevents any substantial charge from being stored on capacitors 14 and 14' when transistor 11 is in its switch-open condition as described above. Diodes 16 and 16' permit only positive charges to be stored on capacitor 14 and only negative charges to be stored on capacitor 14'. Diodes 16 and 16' prevent the charges on capacitors 14 and 14' from leaking off through resistor 13 while transistor 11 is in its switch-open condition.

Although this invention has been described by means of particular embodiments thereof many equivalent arrangements will be apparent to those skilled in the art and are included within the spirit and scope of this invention.

What is claimed is:

1. In a voltage sampling and storing circuit, a source of voltage waves, switching means for sampling said waves, said switching means having a high and a low internal impedance condition, sample storage means responsive in proportion to the magnitudes of voltages impressed thereon for storing samples of said voltage waves, means for connecting said switching means and said source in a series loop circuit with said storage means, and means for limiting the proportion of the total potential of said source which may be impressed upon said storage means, said limiting means comprising a resistor connected in shunt with said storage means, the impedance of said switching means in said high impedance condition being at least one order of magnitude larger than the resistance of said resistor whereby negligible voltage is developed across said resistor and said storage means during said high impedance condition.

2. In a sampling and storage circuit, an electronic switch which is open in the absence of pulses applied thereto, a source of pulses for activating said switch for an interval corresponding to the duration of one of the pulses, a source of voltage to be sampled, a resistance, means for connecting said resistance in a loop including said switch and said voltage source, the impedance of said resistance being a negligible proportion of the total impedance of said loop with said switch open and a principal proportion of said total loop impedance with said switch closed, sample storage means connected in parallel with said resistance and comprising a unilaterally conducting impedance, a capacitor, circuit means for connecting said unilaterally conducting impedance and said capacitor in series across said resistance, and a load resistor connected in parallel with said capacitor.

3. In a signal sampling and storing circuit, a transistor having base, emitter and collector electrodes, said transistor having either a high or a low internal impedance condition established between said emitter and collector electrodes at a given time, a source of pulses, a source of intermittent signals to be sampled, each of said intermittent signals linearly varying between two predetermined magnitudes and overlapping in time one of said pulses, means for storing samples of said signals, means for connecting said emitter and collector electrodes, said signal source and said storing means in a loop circuit, means for normally biasing said base electrode to establish the high internal emitter-collector impedance condition in said transistor in the absence of a pulse from said pulse source thereby substantially blocking current flow in said loop circuit, means for applying the pulses of said pulse source to said base electrode to overcome the normal bias thereon and thereby establish the low internal emitter-collector impedance condition in said transistor for the duration of each of said last-mentioned pulses, each of said last-mentioned low impedance conditions enabling current to flow in said loop circuit for providing in said storing means a voltage which is proportional to the time lag of the start of said one pulse after the start of its corresponding sampled signal, and means for limiting the proportion of the total potential of said signal source which may be impressed upon said storing means, said limiting means including a resistor connected in parallel with said storing means, the impedance of said transistor in the high emitter-collector impedance condition being of a higher order of magnitude than the impedance of said resistor so that any voltage stored in said storing means during said high impedance condition is negligible.

4. The signal sampling and storing circuit according to claim 3 in which said storing means comprise a capacitor connected in series with said signal source in said loop circuit but in parallel with said resistor.

5. The signal sampling and storing circuit according to claim 4 in which said signal source provides signals of a preselected polarity, said capacitor stores samples of the signals of said last-mentioned polarity, and includes a unidirectional device connected in said loop circuit between certain connected terminals of said capacitor and resistor, said device being poled to prevent the signal samples stored in said capacitor from discharging therefrom through said resistor.

6. The signal sampling and storing circuit according to claim 5 which includes a load connected in parallel with said capacitor, said load having an impedance which is preselected with an order of magnitude sufficiently large to prevent substantially an instantaneous discharge therethrough of the signal samples stored in said capacitor.

7. The signal sampling and storing circuit according to claim 3 in which said signal source provides intermittent signals having both positive and negative voltage portions, and said storing means comprises two discrete storing means for storing voltage samples of different polarities, respectively, the total of the voltages stored in both of said discrete storing means in response to each of said pulses being proportional to the time lag of the start of each of said pulses after the start of each of said sampled signals, and said limiting means includes a load resistor connected in shunt of each of said last-mentioned storing means.

8. The combination with a signal sampling circuit having a determinable open circuit leakage resistance for periodically sampling a voltage having both positive and negative components of sample storing means comprising first and second signal storing capacitors, first and second resistors connected in parallel with said first and second signal storing capacitors, respectively, a first diode, circuit means including said first diode for applying the positive portion of the output of said sampling circuit to said first capacitor and first resistor, a second diode, and circuit means including said second diode for applying the negative portion of the output of said sampling circuit to said second capacitor and second resistor, and a resistor connected in shunt with said first and second storage capacitors through said respective diodes, the last-mentioned resistor having a relatively low impedance compared to said sampling circuit leakage resistance whereby leakage through said sampling circuit in the switch open condition is prevented from storing any substantial charge in either of said capacitors.

9. In a circuit for deriving and storing samples of a signal, a transistor having base, emitter, and collector electrodes and having a high and a low internal impedance condition between said emitter and collector electrodes, a source of pulses, a source of signals to be sampled, means for storing signal samples, said storing means comprising a first and a second capacitor, a first and a second resistor each connected in a parallel circuit with one of said first and second capacitors, a first and a second diode respectively connected in a series circuit with one of said parallel circuits, and means connecting said series circuits in parallel with one another, circuit means for serially connecting said emitter and said collector electrodes in a loop circuit with said source of signals to be sampled and said signal storing means, said diodes being poled for conduction in opposite directions in said loop circuit, means for normally biasing said transistor to said high internal impedance condition in the absence of a pulse from said source to block substantially current flow in said loop circuit, means for applying a pulse from said pulse source to said base electrode to bias said transistor into its low internal impedance condition for the duration of said last-mentioned pulse thereby providing a sample of a signal of said signal source for storing in said storing means via said loop circuit, and a resistor connected in parallel with said signal storing means, the impedance of the last-mentioned resistor being of a lower order of magnitude than the impedance of said transistor in said high internal impedance condition.

10. In a signal sampling and storing circuit, a transistor having base, emitter, and collector electrodes, said transistor having either a high or a low internal impedance condition established between said emitter and collector electrodes at a given time, a source of pulses, a source of intermittent signals to be sampled, each of said intermittent signals linearly varying between a negative predetermined magnitude and a positive predetermined magnitude, each of said intermittent signals also overlapping in point of time one of said pulses, a connection between a first terminal of said signal source and ground, means for storing samples of said signals, means for connecting said emitter and collector electrodes, said signal source, and said storing means in a loop circuit, said storing means comprising two capacitors each storing a sampled signal of preselected polarity, each of said capacitors including one ground terminal and another terminal, and a load resistor connected in shunt with each of said capacitors, means for normally biasing said base electrode to establish the high internal emitter-collector impedance condition in said transistor in the absence of a pulse from said pulse source thereby substantially blocking current flow in said loop circuit, means for applying the pulses of said pulse source to said base electrode to overcome the normal bias thereon and thereby establish the low internal emitter-collector impedance condition in said transistor for the duration of each of said last-mentioned pulses, said transistor in its low impedance condition enabling current to flow in said loop circuit for providing in said capacitors a total voltage which is proportional to the time lag of the start of said one pulse after the start of its corresponding overlapping sampled signal, said connecting means including a resistor connected in parallel with said storing means between said another terminal of each of said capacitors and said signal source ground terminal, the impedance of said transistor in the high emitter-collector impedance condition being of a higher order of magnitude than the impedance of the last-mentioned resistor so that any voltage stored in said capacitors during said high impedance condition is negligible.

11. The signal sampling and storing circuit according to claim 10 which includes a pair of unidirectional devices, each being connected in said loop circuit in series with a different one of said capacitors and being poled to prevent the signal samples stored in the respective last-mentioned capacitors from discharging through said connecting means resistor to ground.

12. The signal sampling and storing circuit according to claim 11 which includes sample adding means comprising a resistive potentiometer having an adjustable tap thereon, means for connecting the fixed resistance portion of said potentiometer between said another terminals of said capacitors, and an output circuit connected between said tap and said signal source ground terminal.

13. A pulse position demodulator for comparing the output waves of a first and a second source of pulses comprising means for generating an output wave of a predetermined configuration with respect to time in response to a pulse from said first source, means for applying pulses from said first source to said generating means, a switch having a finite open circuit impedance, a resistor, a sampling circuit including said switch and said resistor connected in a series, means for applying said output wave of said generating means to said sampling circuit, said resistor having an impedance of a lower order of magnitude than said switch open circuit impedance whereby leakage current in said sampling circuit through said switch open circuit impedance causes a negligible portion of the total sampling circuit potential drop to appear across said resistor, means for actuating said sampling circuit to close said switch for a predetermined time in response to a pulse from said second source, capacitive sample storage means, the impedance of said resistor being of a higher order of magnitude than the closed circuit impedance of said switch whereby the closed circuit potential drop across said resistor is a function of the configuration of said output wave and of the elapsed time between the starts of said pulses from said first and said second sources, means for connecting said storage means in parallel with said resistor so that said capacitive storage means is charged to potentials appearing across said resistor, unilaterally conducting impedance means, means including said unilaterally conducting impedance for preventing the discharge of said storage means through said resistor, and load impedance means connected to provide a discharge path for said storage means.

References Cited in the file of this patent

UNITED STATES PATENTS

| | | |
|---|---|---|
| 2,644,896 | Lo | July 7, 1953 |
| 2,665,845 | Trent | Jan. 12, 1954 |
| 2,760,087 | Felker | Aug. 21, 1956 |